US010212641B2

(12) United States Patent
Sun et al.

(10) Patent No.: US 10,212,641 B2
(45) Date of Patent: Feb. 19, 2019

(54) RELAYING APPARATUS OF A MOBILE DEVICE, AND METHOD THEREOF

(71) Applicant: HISENSE MOBILE COMMUNICATIONS TECHNOLOGY CO., LTD., Qingdao (CN)

(72) Inventors: Zizhi Sun, Qingdao (CN); Bin Zheng, Qingdao (CN); Chuanqing Yang, Qingdao (CN); Shidong Shang, Qingdao (CN); Changsheng Zhou, Qingdao (CN)

(73) Assignees: Hisense Mobile Communications Technology Co., Ltd., Qingdao (CN); Hisense USA Corporation, Suwanee, GA (US); Hisense International Co., Ltd., Qingdao (CN)

( * ) Notice: Subject to any disclaimer, the term of this patent is extended or adjusted under 35 U.S.C. 154(b) by 206 days.

(21) Appl. No.: 15/091,044

(22) Filed: Apr. 5, 2016

(65) Prior Publication Data
US 2017/0094581 A1 Mar. 30, 2017

(30) Foreign Application Priority Data
Sep. 30, 2015 (CN) .......................... 2015 1 0640465

(51) Int. Cl.
H04W 12/06 (2009.01)
H04W 40/22 (2009.01)
(Continued)

(52) U.S. Cl.
CPC .......... H04W 40/22 (2013.01); H04L 45/745 (2013.01); H04L 61/2503 (2013.01);
(Continued)

(58) Field of Classification Search
CPC ............... H04L 45/745; H04L 61/1511; H04L 61/2503; H04L 61/2514; H04L 61/2557; H04W 12/06; H04W 40/22; H04W 72/082
(Continued)

(56) References Cited

U.S. PATENT DOCUMENTS

2004/0185845 A1* 9/2004 Abhishek .............. H04W 48/16
455/422.1
2008/0089298 A1* 4/2008 Anschutz .............. H04W 8/005
370/338
(Continued)

FOREIGN PATENT DOCUMENTS

| CN | 101742496 A | 6/2010 |
| CN | 104394577 A | 3/2015 |
| CN | 104468675 A | 3/2015 |

OTHER PUBLICATIONS

Office Action from corresponding Chinese Application No. 201510640465.8 dated Feb. 24, 2018 (6 pages).

Primary Examiner — Robert J Lopata
(74) Attorney, Agent, or Firm — Harness, Dickey & Pierce, P.L.C.

(57) ABSTRACT

Embodiments of this disclosure provide a relaying apparatus of a mobile device and an method thereof, the apparatus including: at least one processor; and a memory in which at least one instruction executable by the at least one processor is stored, wherein the at least one instruction is configured to be executed by the at least one processor: to connect the mobile device with a wireless access point; to obtain login information for logging into the mobile device; to enable a packet forwarding function to enable a data packet to be forwarded between different nodes of Wi-Fi in the mobile device; to send a relay instruction to a Wi-Fi module through a P2P node of Wi-Fi when the wireless access point is a
(Continued)

router and the mobile device is connected with the router through a station node of Wi-Fi, so that the login information of the mobile device is broadcasted, and one or more electronic devices are connected through the P2P node; to send configuration information of packet forwarding to the Wi-Fi module to enable the data packet to be forwarded between the station node and the P2P node; and to enable a portable hotspot softAP node according to the login information to connect the mobile device with one or more electronic devices, when the wireless access point is a base station and the mobile device is connected with the base station through a mobile communication data node.

17 Claims, 5 Drawing Sheets

(51) Int. Cl.
  *H04L 12/741* (2013.01)
  *H04L 29/12* (2006.01)
  *H04W 72/08* (2009.01)

(52) U.S. Cl.
  CPC ...... *H04L 61/2514* (2013.01); *H04L 61/2557* (2013.01); *H04W 12/06* (2013.01); *H04L 61/1511* (2013.01); *H04W 72/082* (2013.01)

(58) Field of Classification Search
  USPC .......................................................... 370/315
  See application file for complete search history.

(56) References Cited

U.S. PATENT DOCUMENTS

| | | | |
|---|---|---|---|
| 2010/0178911 A1* | 7/2010 | Dailey | H04W 76/002 455/422.1 |
| 2010/0261479 A1* | 10/2010 | Hidaka | H04L 45/12 455/445 |
| 2011/0045822 A1* | 2/2011 | Hidaka | H04W 40/24 455/424 |
| 2011/0194485 A1* | 8/2011 | Horneman | H04W 72/042 370/315 |
| 2014/0056209 A1 | 2/2014 | Park et al. | |
| 2014/0126461 A1* | 5/2014 | Ghosh | H04W 88/04 370/315 |
| 2014/0204834 A1* | 7/2014 | Singh | H04W 40/22 370/315 |
| 2014/0241187 A1* | 8/2014 | Barkay | H04W 76/23 370/252 |
| 2014/0366105 A1* | 12/2014 | Bradley | H04W 12/08 726/5 |
| 2015/0244876 A1 | 8/2015 | Jabara et al. | |
| 2015/0312945 A1* | 10/2015 | Park | H04W 12/04 370/338 |
| 2016/0113050 A1* | 4/2016 | Li | H04W 52/0209 370/329 |
| 2016/0156719 A1* | 6/2016 | Mobarak | H04L 67/141 726/4 |
| 2017/0019473 A1* | 1/2017 | Venkataraman | H04L 41/22 |
| 2017/0048785 A1* | 2/2017 | Ge | H04W 48/16 |
| 2017/0070919 A1* | 3/2017 | Verger | H04L 67/14 |
| 2017/0250845 A1* | 8/2017 | Suzuki | H04L 27/2607 |
| 2017/0290020 A1* | 10/2017 | Aiba | H04W 72/0473 |
| 2017/0346630 A1* | 11/2017 | Nadathur | H04L 9/006 |
| 2018/0098229 A1* | 4/2018 | Park | H04W 88/04 |

* cited by examiner

RELAYING APPARATUS OF A MOBILE DEVICE, AND METHOD THEREOF

CROSS-REFERENCE TO RELATED APPLICATION

This application claims the benefit and priority of Chinese Patent Application No. 201510640465.8 filed Sep. 30, 2015. The entire disclosure of the above application is incorporated herein by reference.

FIELD

This disclosure relates to the field of mobile communications and particularly to a relaying apparatus of a mobile device, and method thereof.

BACKGROUND

This section provides background information related to the present disclosure which is not necessarily prior art.

Along with the improving level of our social life, wireless signals, e.g., Wireless Fidelity (Wi-Fi), have been widely applied to the various aspects of our life due to their convenience and expeditiousness.

SUMMARY

This section provides a general summary of the disclosure, and is not a comprehensive disclosure of its full scope or all of its features.

According to one aspect of this disclosure, a relaying method of a mobile device is disclosed. The method includes:

connecting the mobile device with a wireless access point;

obtaining login information for logging into the mobile device;

enabling a packet forwarding function to enable a data packet to be forwarded between different nodes of Wi-Fi in the mobile device;

sending a relay instruction to a Wi-Fi module through a P2P node of Wi-Fi when the wireless access point is a router and the mobile device is connected with the router through a station node of Wi-Fi, so that the login information of the mobile device is broadcasted, and one or more electronic devices are connected through the P2P node;

sending configuration information of packet forwarding to the Wi-Fi module to enable the data packet to be forwarded between the station node and the P2P node; and enabling a portable hotspot softAP node according to the login information to connect the mobile device with one or more electronic devices, when the wireless access point is a base station and the mobile device is connected with the base station through a mobile communication data node.

According to another aspect of this disclosure, a relaying apparatus is disclosed. The apparatus is applicable to the mobile device, and the apparatus includes:

a wireless access node connecting module configured to connect the mobile device with a wireless access point;

a login information obtaining module configured to obtain login information for logging into the mobile device;

a packet forward enabling module configured to enable a packet forwarding function to enable a data packet to be forwarded between different nodes of Wi-Fi in the mobile device;

a relay instruction sending module configured to send a relay instruction to a Wi-Fi module through a P2P node of Wi-Fi when the wireless access point is a router and the mobile device is connected with the router through a station node of Wi-Fi, so that the login information of the mobile device is broadcasted, and one or more electronic devices are connected through the P2P node;

a packet forward configuring module configured to send configuration information of packet forwarding to the Wi-Fi module to enable the data packet to be forwarded between the station node and the P2P node; and a portable hotspot setting module configured to enable a portable hotspot softAP node according to the login information to connect the mobile device with one or more electronic devices, when the wireless access point is a base station and the mobile device is connected with the base station through a mobile communication data node.

Further aspects and areas of applicability will become apparent from the description provided herein. It should be understood that various aspects of this disclosure may be implemented individually or in combination with one or more other aspects. It should also be understood that the description and specific examples herein are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

DETAILED DESCRIPTION

Example embodiments will now be described more fully with reference to the accompanying drawings.

Figure 1:
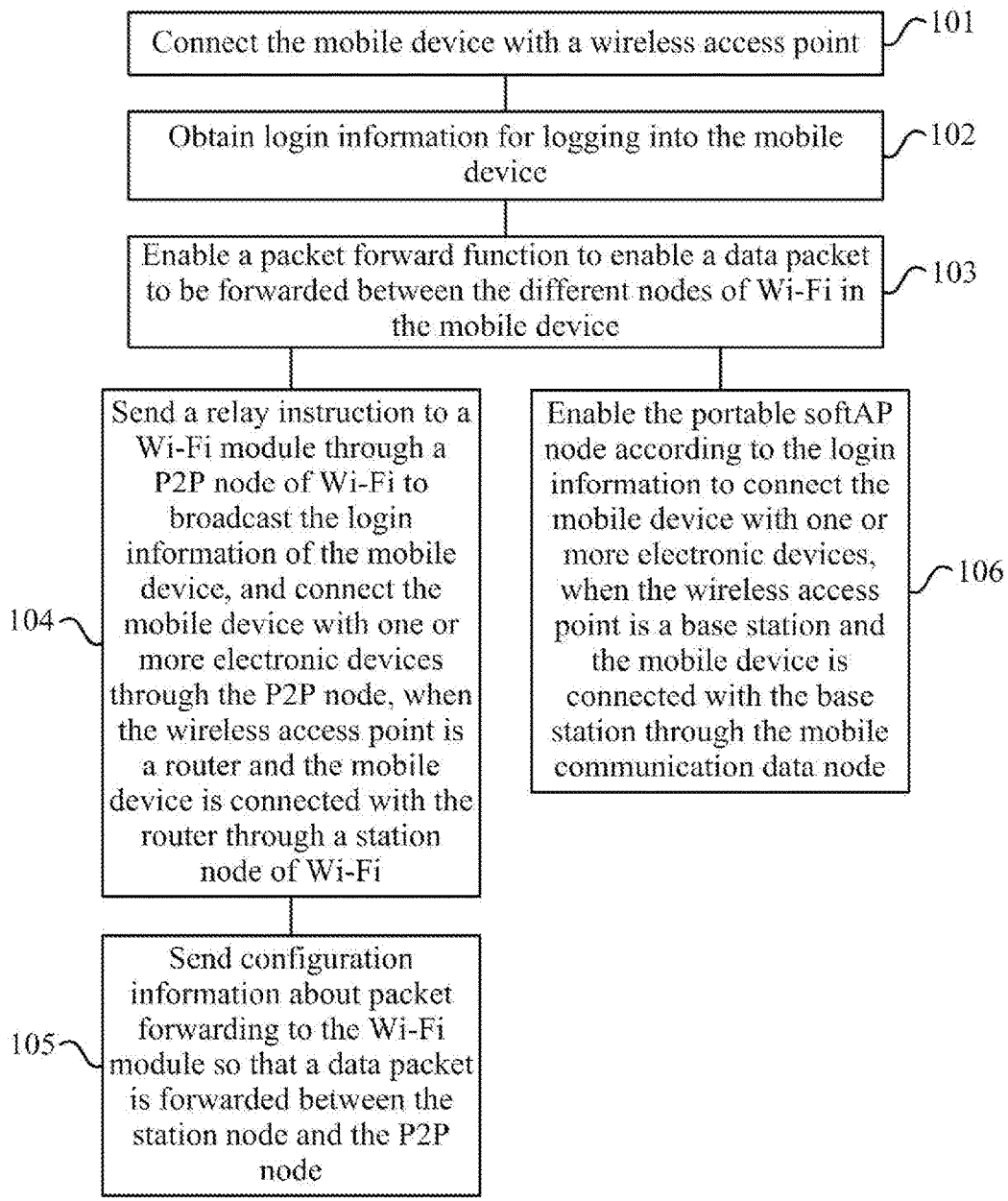
FIG. 1 is a flow chart of steps in a relaying method of a mobile device according to some embodiments of this disclosure.

Referring to FIG. 1 illustrating a flow chart of steps in a relaying method of a mobile device according to some embodiments of this disclosure, the method includes the following steps:

The step 101 is to connect the mobile device with a wireless access point.

It shall be noted that the embodiment of this disclosure may be applicable to an operating system of the mobile device, e.g., a handset, a tablet computer, a smart wearable device (e.g., a smart watch), etc.

These mobile devices generally support Windows Phone, Android, IOS, Windows, and other operating systems, and typically may be connected with a wireless Access Point (AP), e.g., a router, through Wireless Fidelity (Wi-Fi).

Figure 2:
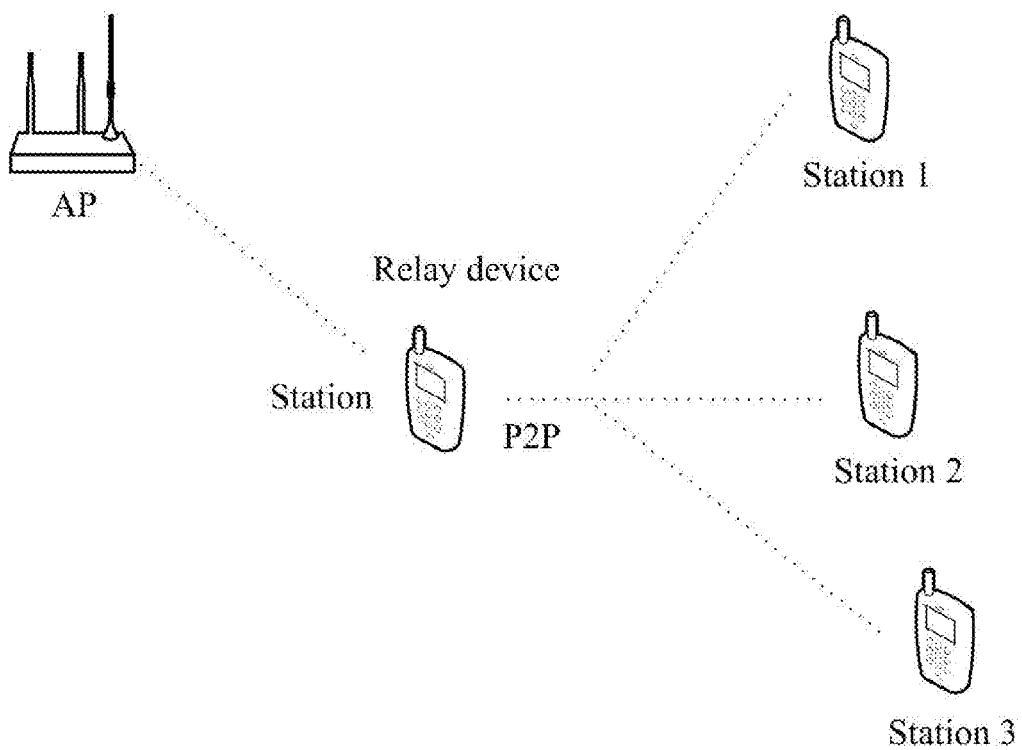
FIG. 2 is a diagram of a topology of a relay system according to some embodiments of this disclosure.

As illustrated in FIG. 2, the AP is a specific node, that is, a router or a base station, in a wireless network, through which another type of node in the wireless network may communicate with the outside or inside of the wireless network.

Wi-Fi of the mobile device typically functions as a station or a soft AP, or in P2P.

Particularly the station refers to such a device accessing the wireless network that may communicate with another device inside or outside the wireless network through a wireless access point.

The soft AP refers to the mobile device functioning as a wireless access point so that the soft AP-enabled mobile device may act as a router enabling an access of another station to the wireless network.

The P2P (Peer-to-Peer), also referred to as Wi-Fi Direct, may enable two Wi-Fi devices to be connected directly with and to communicate with each other without any wireless access point.

The getWifiState( ) function in WifiManager may be invoked to determine whether the mobile device is enabled as a station node of Wi-Fi.

If a station node being enabled is detected, then the API interface getNetworkInfo( ) available from ConnectivityManager may be invoked by inputting ConnectivityManager.TYPE_WIFI as a parameter thereto to determine whether the station node is connected with the wireless access point.

If the returned NetworkInfo object is not Null, and isConnected( ) is true, then it will be determined that the station node is connected with the AP.

If it is determined that the station node is connected with the wireless access point, then it will be determined that the mobile device is connected with the router.

If it is determined that the station node is not enabled or is connected invalidly with the router (for example, there is no available access to the Internet), then it will be determined that the mobile device is connected with a base station, e.g., a 3G signal, a 4G signal, etc., so that Wi-Fi may be applied preferentially.

The step 102 is to obtain login information for logging into the mobile device;

The login information may include a Service Set Identifier (SSID) and a password.

The user is asked in a User Interface (UI) to enter the SSID (service set identifier) and the password of the relay device (i.e., the mobile device).

If the user enters the SSID and the password on the UI, then the SSID and the password will be applied; otherwise, a default SSID and a default password will be applied.

The step 103 is to enable a packet forward function to enable a data packet to be forwarded between the different nodes of Wi-Fi in the mobile device.

The packet forward function may be enabled using the echo attribute value.

echo 1>/proc/sys/net/ipv4/ip_forward

Packet forwarding refers to forwarding a data packet from one device to another device.

In some embodiments of this disclosure, the packet forwarding function is enabled to enable a data packet to be forwarded between the station and the P2P, or between a mobile communication data node and a portable hotspot softAP node.

The step 104 is to send a relay instruction to a Wi-Fi module through the P2P node of Wi-Fi to broadcast the login information of the mobile device, and to connect the mobile device with one or more electronic devices through the P2P node, when the wireless access point is a router and the mobile device is connected with the router through the station node of Wi-Fi;

As illustrated in FIG. 2, if Wi-Fi has been connected with the active AP, then the relay instruction may be sent to the Wi-Fi module to start Wi-Fi relaying.

In some embodiments of this disclosure, the step 104 may include the following sub-steps:

The sub-step S11 is to detect a first channel over which the wireless access point, to which the station node is connected, operates;

The sub-step S12 is to calculate a second channel without interference from and to the first channel;

The sub-step S13 is to obtain the login information for logging into the mobile device, where the login information includes the service set identifier and the password;

The sub-step S14 is to calculate a first length of the service set identifier, and a second length of the password;

The sub-step S15 is to encapsulate the second channel, the service set identifier, the first length, the password, and the second length in the relay instruction; and The sub-step S16 is to send the relay instruction to the Wi-Fi module in a group mode of the P2P node of Wi-Fi to broadcast the service set identifier at the first length over the second channel.

If the station of Wi-Fi is enabled and connected with the AP, then the first channel of the AP, to which the station is connected, may be obtained, and if P2P is enabled, then a command over the second channel without interference from and to the station may be sent to the Wi-Fi module.

Here the Wi-Fi module, also referred as a serial interface Wi-Fi module, at the transport layer of the Internet of Things may be an embedded module, an inbuilt wireless network protocol IEEE 802.11b.g.n protocol stack, and a TCP/IP protocol stack, configured to convert a serial interface or TTL level in compliance with a Wi-Fi wireless network communication standard.

A hardware device in which the Wi-Fi module is embedded may access the Internet directly using Wi-Fi, which is an important component to enable wireless intelligent home, Machine to Machine (M2M), and other Internet of Things applications.

In the Android system, WifiService is responsible for core services of the WiFi function, and particularly the WiFiStateMachine sub-system is responsible for maintaining various state information of WiFi.

The state information includes channel information of the AP, so the first channel of the AP with which the station node is connected may be obtained by invoking the mWifiStateMachine.fetchFrequencyNative( ) function of the system.

Frequencies corresponding to different channels are as follows:

Freq=2412 (Channel 1) Freq=2417 (Channel 2) Freq=2422 (Channel 3)
Freq=2427 (Channel 4) Freq=2432 (Channel 5) Freq=2437 (Channel 6)
Freq=2442 (Channel 7) Freq=2447 (Channel 8) Freq=2452 (Channel 9)
Freq=2457 (Channel 10) Freq=2462 (Channel 11) Freq=2467 (Channel 12)
Freq=2472 (Channel 13)

For the relay function to be performed, typically the first channel of the station and the second channel of the P2P shall not interfere with each other; otherwise, the relay function may forward data poorly and relay at degraded performance due to interference between the channels, which arises from the setting of the channels.

For a type of channel in the 2.4G band, the second channel may be the first channel shifted by at least 5 channels.

If X represents the first channel of the AP, and Y represents the second channel of the relay device (i.e., the mobile device), then both of them will satisfy the following relationship:

$$Y \geq X+5 \text{ or } Y \leq X-5;$$

Where X and Y are positive integers, and if Y<1 or Y>13, then Y will be invalidated and rejected.

For a type of channel in the 5G band, the second channel may be another channel than the first channel.

Then the user is asked in a User Interface (UI) to enter the SSID (service set identifier) and the password of the relay device (i.e., the mobile device).

If the user enters the SSID and the password on the UI, then the SSID and the password will be applied; otherwise, a default SSID and a default password will be applied.

The first length of the SSID, and the second length of the password are calculated for the relay instruction to be sent.

There are two existing P2P modes including a P2P group mode and a P2P client.

The P2P group mode enables a number of Wi-Fi devices to constitute a network (a P2P network, also referred to as a P2P group), and to communicate with each other, without any AP.

Before the P2P group is created, all the smart terminals are respective P2P devices.

After these P2P devices negotiate about P2P, one of the devices plays the role of a Group Owner (GO) (i.e., acts as an AP), and the other devices play the role of clients.

The original P2P group function is:
p2p_ctrl_group_add(struct  wpa_supplicant*wpa_s, char*cmd)

In this P2P group function, none of the channel, the SSID, the password, and the other parameters may be sent.

In the embodiment of the disclosure, the Wi-Fi protocol stack is modified by forcibly setting the P2P mode to the group mode in which the SSID and the password may be set as desirable to the user so that the relay device (i.e., the mobile device) may be scanned and identified by an external electronic device using the SSID, and communication may be secured using the password.

The P2P_GROUP_ADD instruction is extended in the Wi-Fi protocol stack Wpa_supplicant of the system:
wpas_p2p_group_add_with_ssid(wpa_s, 1, freq, ht40, ssid, passphrase, ssid_len, passphrase_len)

Where freq represents the second channel, ssid_len represents the first length, passphrase represents the password, and passphrase_len represents the second length.

The channel, the SSID, the password, and the other parameters may be sent in the extended P2P group function.

After the relay instruction is sent, the relay device (i.e., the mobile device) sends a broadcast frame carrying the SSID, and the other scanning electronic device locating the relay device may be connected using the SSID and the password.

The step 105 is to send configuration information about packet forwarding to the Wi-Fi module so that a data packet is forwarded between the station node and the P2P node.

In a real application, the address table service iptables of the system may be invoked to send a routing table to the Wi-Fi module, where the routing table includes a route between a first IP address of the P2P node, and a second IP address of the station node; and The address table service iptables of the system may be invoked to send configuration information of the Network Address Translation (NAT) function to the Wi-Fi module, where the source IP address and the destination IP address of the IP packet are modified automatically by the NAT function to translate the first IP address of the P2P node.

Of course a prior routing table may be further removed before the routing table and the NAT function are sent.

The configuration information of iptables and NAT configuration is as follows:
remove old rules (The prior routing table is removed)
iptables -F
iptables -t filter -F
iptables -t nat -F
Bring up NAT rules
iptables -t nat -A POSTROUTING -s 192.168.49.0/24 -d 0.0.0.0/0 -j MASQUERADE Particularly if the IP segment of the relay device (i.e., the mobile device) is 192.168.49.0, then "Bring up NAT rules" may be sent to re-encapsulate and de-encapsulate the data packet with the source address being the network segment of 192.168.49.0/24 by translating the source address into 0.0.0.0/0, and to forward the data packet to the station.

The step 106 is to enable the portable softAP node according to the login information to connect the mobile device with one or more electronic devices, when the wireless access point is a base station and the mobile device is connected with the base station through the mobile communication data node.

The user may set in the UE the portable hotspot softAP node of the application to be enabled.

For example, the softAP mode is set in the UI to "Enabled", and if there is a prompt of "Confirm enabling the softAP mode", then the button "OK" will be clicked on.

If the portable hotspot softAP node is enabled, then a softAP instruction may be sent using the SSID and the password to enable the softAP node to be connected with one or more electronic devices.

It shall be noted that since the softAP node operates in either of the 2.4 GHz and 5 GHz radio frequency bands, the softAP node is typically set by setting an operating frequency band.

In some embodiments of this disclosure, the method may further include the following step:

The step 107 is to send configuration information of a Domain Name System (DNS) to the Wi-Fi module so that the data packet received by the P2P node is forwarded.

The address table service iptables in the system may be invoked to send the address of a gateway of the DNS based on the Transport Control Protocol (TCP) to the Wi-Fi module;

The command format is:
iptables -t nat -I PREROUTING -i (the name of the relay device) -p tcp --dport 53 -j DNAT --to-destination (the router gateway); and The address table service iptables in the system may be invoked to send the address of the gateway of the DNS in the open system internet protocol UDP to the Wi-Fi module;

The command format is:
iptables -t nat -I PREROUTING -i (the name of the relay device) -p udp --dport 53 -j DNAT --to-destination (the router gateway)

As described above, the DNS gateway addresses based on the TCP and the UDP are added to the relay device (i.e., the mobile device), and after the DNS is configured, the input IP address is parsed by the DNS server for communication over the network.

In the embodiments of this disclosure, the AP is connected through the station node for communication, the electronic device is connected through the P2P node for communication, and data is forwarded between the station node and the P2P node, or the softAP is enabled by the application to be connected with the electronic device, and the softAP and relay functions are integrated in the mobile device; since the mobile device has been widely popularized, the existing mobile device may be reused as a relay to thereby avoid additional hardware from being configured, so as to greatly lower the cost; the relay or the portable hotspot may be enabled as needed to thereby improve the operational flexibility; and since no fixed power source jack is required to power the mobile device, the well-portable mobile device may be adjusted in position to the strength of a signal to thereby greatly enhance the relayed wireless signal.

Figure 3:
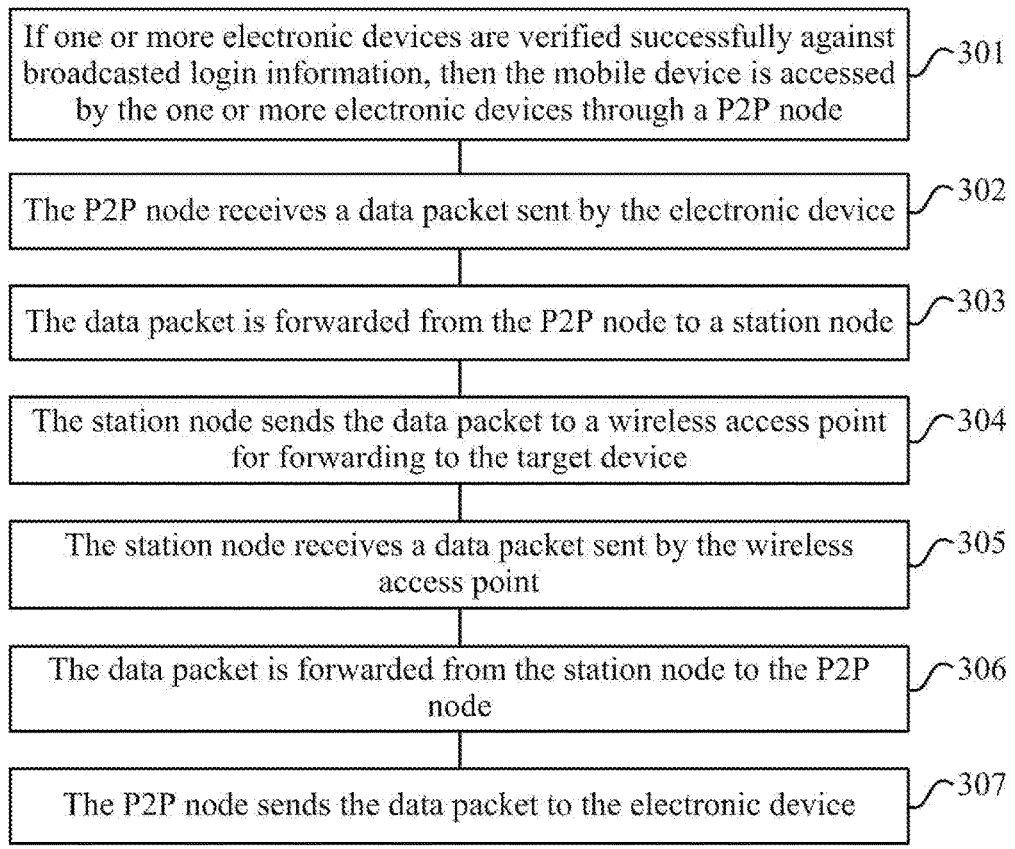
FIG. 3 is a flow chart of steps in a relaying method of a mobile device according to some embodiments of this disclosure.

Referring to FIG. 3, there is illustrated a flow chart of steps in a relaying method of a mobile device according to some embodiments of this disclosure, where the method may include the following steps:

In the step 301, if one or more electronic devices are verified successfully against broadcasted login information, then the mobile device is accessed by the one or more electronic devices through a P2P node;

The relay device (i.e., the mobile device) may be regarded as an AP to broadcast a beacon frame periodically so that another scanning station device locating the beacon frame may be provided with an SSID of the relay device (i.e., the mobile device).

If a request sent by the one or more electronic devices for a service set identifier in the login information is received, then a response message of Challenge Text is returned to the one or more electronic devices;

If a connection request sent by the one or more electronic devices is received, then a password in the connection request is verified for consistency with a password in the login information according to a second length of the password in the login information; and If the passwords are consistent, then the one or more electronic devices access the mobile terminal, e.g., electronic devices of Station 1, Station 2, and Station 3 as illustrated in FIG. 2.

In the step 302, the P2P node receives a data packet sent by the electronic device;

If the connected electronic device communicates with an external target device, then the electronic device will send the data packet to the relay device (i.e. the mobile device).

In the step 303, the data packet is forwarded from the P2P node to a station node;

It is determined whether a source address of the data packet is a first IP address of the P2P node, e.g., 192.168.49.0, and if so, then the first IP address is translated into a destination IP address of 0.0.0.0 based upon configuration information of NAT; and A routing table is searched for a second IP address corresponding to the first IP address, and since a packet forwarding function is enabled in advance, a converted data packet from the destination IP address may be forwarded to a station node at the second IP address.

In the step 304, the station node sends the data packet to a wireless access point for forwarding to the target device;

In a real application, the data packet includes Uniform Resource Locator (URL) information, and the wireless access point maps the URL information to an IP address through a Domain Name System (DNS), and forwards the data packet to the target device at the IP address, e.g., a web server, through the base station illustrated in FIG. 2.

It shall be noted that the station node operates over a first channel, and the P2P node operates over a second channel, thus avoiding interference to each other.

In the step 305, the station node receives a data packet sent by the wireless access point.

If the external target device communicates with the electronic device connected therewith, then the target device will send the data packet to the relay device (i.e., the mobile device) through the base station.

In the step 306, the data packet is forwarded from the station node to the P2P node;

If a second IP address of the station node from which the data packet is to be forwarded is determined, and the routing table is searched for a first IP address corresponding to the second IP address, then the data packet may be forwarded to the P2P node at the first IP address.

In the step 307, the P2P node sends the data packet to the electronic device.

The relay device sends the data packet of the external target device to the electronic device through the P2P node to thereby relay the data packet.

It shall be noted that the station node operates over a first channel, and the P2P node operates over a second channel, thus avoiding interference to each other.

It shall be noted that for the sake of a concise description, the embodiments of the method have been described as a series of actions in combination, but those skilled in the art shall appreciate that the embodiment of this disclosure will not be limited to the described order of the actions because some of the steps may be performed in another order or concurrently dependent upon the embodiments of this disclosure. Secondly those skilled in the art shall also appreciate that all the embodiments described here are preferred embodiments, but all the actions involved in the embodiments may not be necessary to the embodiments of this disclosure.

Figure 4:
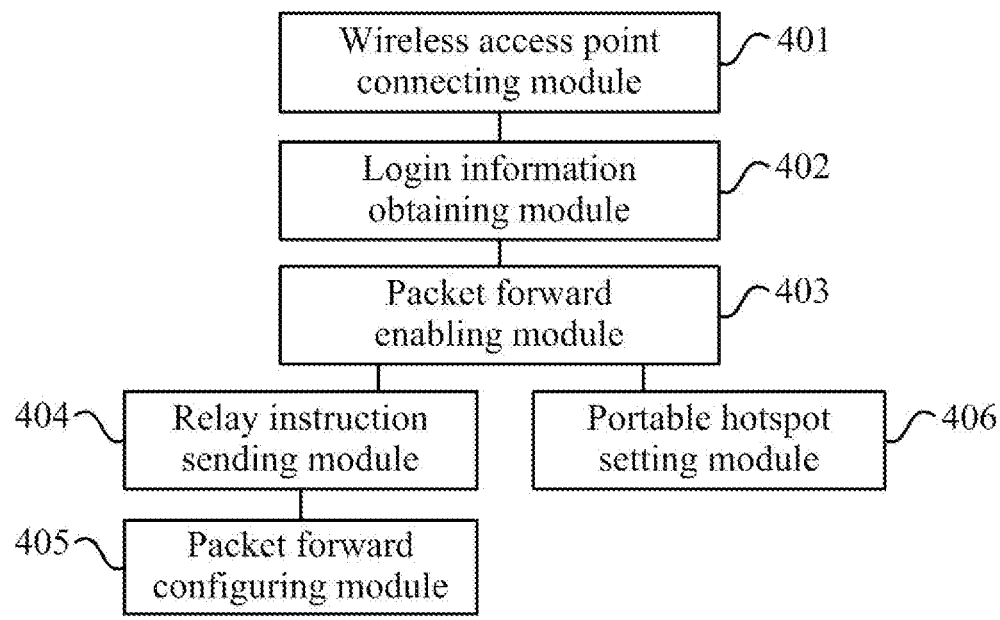
FIG. 4 is a structural block diagram of a relaying apparatus according to some embodiments of this disclosure.

Referring to FIG. 4, there is illustrated a structural block diagram of a relaying apparatus according to some embodiments of this disclosure, applicable to a mobile device. In some embodiments, the relaying apparatus may be a mobile device itself. The apparatus may particularly include the following modules:

A wireless access node connecting module 401 is configured to connect the mobile device with a wireless access point;

A login information obtaining module 402 is configured to obtain login information for logging into the mobile device;

A packet forward enabling module 403 is configured to enable a packet forwarding function to enable a data packet to be forwarded between different nodes of Wi-Fi in the mobile device;

A relay instruction sending module 404 is configured to send a relay instruction to a Wi-Fi module through a P2P node of Wi-Fi when the wireless access point is a router and the mobile device is connected with the router through a station node of Wi-Fi, so that the login information of the mobile device is broadcasted, and one or more electronic devices are connected through the P2P node;

A packet forward configuring module 405 is configured to send configuration information of packet forwarding to the Wi-Fi module to enable the data packet to be forwarded between the station node and the P2P node; and A portable hotspot setting module 406 is configured to enable a portable hotspot softAP node according to the login information to connect the mobile device with one or more electronic devices, when the wireless access point is a base station and the mobile device is connected with the base station through a mobile communication data node.

In some embodiments of this disclosure, the apparatus may further include the following module:

A DNS configuring module is configured to send configuration information of a Domain Name System (DNS) to the Wi-Fi module so that a data packet received by the P2P node is forwarded.

In some embodiments of this disclosure, the wireless access node connecting module 401 may include the following sub-modules:

An enabled Wi-Fi detecting sub-module is configured to determine whether the station node of Wi-Fi is enabled in the mobile device;

A connected wireless access point detecting sub-module is configured to determine whether the station node is connected with the wireless access point, when the station node is enabled;

A connection determining sub-module is configured to determine that the mobile device is connected with the router, when the station node is connected with the wireless access point; and A mobile communication data node connecting sub-module is configured to determine that the mobile device is connected with the base station, when the station node is not enabled or is connected invalidly with the router.

In some embodiments of this disclosure, the relay instruction sending module 404 may include the following sub-modules:

A channel detecting sub-module is configured to detect a first channel over which the wireless access point, to which the station node is connected, operates;

A channel calculating sub-module is configured to calculate a second channel without interference from and to the first channel;

A login information obtaining sub-module is configured to obtain the login information for logging into the mobile device, where the login information includes a service set identifier and a password;

A length calculating sub-module is configured to calculate a first length of the service set identifier, and a second length of the password;

A relay instruction encapsulating sub-module is configured to encapsulate the second channel, the service set identifier, the first length, the password, and the second length in the relay instruction; and A group broadcasting sub-module is configured to send the relay instruction to the Wi-Fi module in a group mode of the P2P node of Wi-Fi to broadcast the service set identifier at the first length over the second channel.

In some embodiments of this disclosure, the packet forward configuring module 405 may include the following sub-modules:

A routing table sending sub-module is configured to send a routing table to the Wi-Fi module, where the routing table includes a route between a first IP address of the P2P node, and a second IP address of the station node; and An NAT sending sub-module is configured to send configuration information of a Network Address Translation (NAT) function to the Wi-Fi module so that the first IP address of the P2P node is translated.

In some embodiments of this disclosure, the DNS configuring module may include the following sub-modules:

A TCP configuration sending sub-module is configured to send the address of a gateway of the Domain Name System (DNS) based on the Transport Control Protocol (TCP) to the Wi-Fi module; and A UDP configuration sending sub-module is configured to send the address of the gateway of the Domain Name System (DNS) based on the open system internet protocol UDP to the Wi-Fi module.

In some embodiments of this disclosure, the apparatus may further include the following module:

A device accessing module is configured, if the one or more electronic devices are verified successfully against the broadcasted login information, to have the one or more electronic devices access the P2P node.

In some embodiments of this disclosure, the device accessing module may further include the following sub-modules:

A responding sub-module is configured, if a request sent by the one or more electronic devices for a service set identifier in the login information is received, to return a response message to the one or more electronic devices;

A verifying sub-module is configured, if a connection request sent by the one or more electronic devices is received, to verify a password in the connection request for consistency with a password in the login information according to a second length of the password in the login information; and if the passwords are consistent, to invoke an access sub-module; and The accessing sub-module is configured to have the one or more electronic device access.

In some embodiments of this disclosure, the apparatus may further include the following modules:

A first data packet receiving module is configured to receive in the P2P node a data packet sent by the electronic device;

A first data packet forwarding module is configured to forward the data packet from the P2P node to the station node; and A first data packet sending module is configured to send the data packet in the station node to the wireless access point for forwarding to a target device.

The data packet includes URL information, and the wireless access point maps the URL information to an IP address through a Domain Name System (DNS), and forwards the data packet to the target device at the IP address.

In some embodiments of this disclosure, the first data packet forwarding module may include the following sub-modules:

An IP address determining sub-module is configured to determine whether a source address of the data packet is a first IP address of the P2P node; and if so, to invoke a translating sub-module;

The translating sub-module is configured to translate the first IP address into a target IP address;

A first routing table searching sub-module is configured to search a routing table for a second IP address corresponding to the first IP address; and A first forwarding sub-module is configured to forward a converted data packet from the target IP address to the station node at the second IP address.

In some embodiments of this disclosure, the apparatus may further include the following modules:

A second data packet receiving module is configured to receive in the station node a data packet sent by the wireless access point;

A second data packet forwarding module is configured to forward the data packet from the station node to the P2P node; and A second data packet sending module is configured to send the data packet in the P2P node to the electronic device.

In some embodiments of this disclosure, the second data packet forwarding module may include the following sub-modules:

An IP address determining sub-module is configured to determine a second IP address of a station node from which the data packet is to be forwarded;

A second routing table searching sub-module is configured to search a routing table for a first IP address corresponding to the second IP address; and A second forwarding sub-module is configured to forward the data packet to the P2P node at the first IP address.

Since the embodiments of the apparatus are substantially similar to the embodiments of the method, the embodiments of the apparatus have been described in brief, and reference may be made to the description of the embodiments of the method for details of the embodiments of the apparatus.

Figure 5:
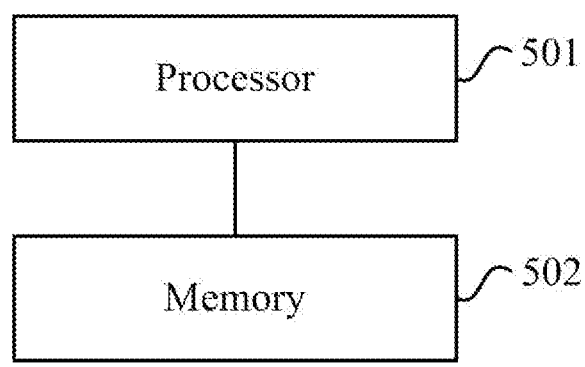
FIG. 5 is another structural block diagram of a relaying apparatus according to some embodiments of this disclosure.

Referring to FIG. 5, another structural block diagram of a relaying apparatus according to some embodiments of this disclosure, applicable to a mobile device, is illustrated. In some embodiments, the apparatus may be a mobile device itself. the apparatus may include: at least one processor 501, and a memory 502 in which at least one instruction executable by the at least one processor 501 is stored, where the at least one instruction is configured to be executed by the at least one processor 501 to connect the mobile device with a wireless access point, to obtain login information for logging into the mobile device, to enable a packet forwarding function to enable a data packet to be forwarded between different nodes of Wi-Fi in the mobile device, to send a relay instruction to a Wi-Fi module through a P2P node of Wi-Fi when the wireless access point is a router and the mobile device is connected with a router through a station node of Wi-Fi, so that the login information of the mobile device is broadcasted, and one or more electronic devices are connected through the P2P node, to send configuration information of packet forwarding to the Wi-Fi module to enable the data packet to be forwarded between the station node and the P2P node, and to enable a portable hotspot softAP node according to the login information to connect the mobile device with one or more electronic devices, when the wireless access point is a base station and the mobile device is connected with the base station through a mobile communication data node.

The at least one instruction may be further configured to be executed by the at least one processor 501 for the mobile device to send configuration information of a Domain Name System (DNS) to the Wi-Fi module so that a data packet received by the P2P node is forwarded.

The at least one instruction may be further configured to be executed by the at least one processor 501 for the mobile device to determine whether the station node of Wi-Fi is enabled in the mobile device, to determine whether the station node is connected with the wireless access point, when the station node is enabled, to determine that the mobile device is connected with the router, when the station node is connected with the wireless access point, and to determine that the mobile device is connected with the base station, when the station node is not enabled or is connected invalidly with the router.

The at least one instruction may be further configured to be executed by the at least one processor 501 for the mobile device to detect a first channel over which the wireless access point, to which the station node is connected, operates, to calculate a second channel without interference from and to the first channel, to obtain the login information for logging into the mobile device, where the login information includes a service set identifier and a password, to calculate a first length of the service set identifier, and a second length of the password, to encapsulate the second channel, the service set identifier, the first length, the password, and the second length in the relay instruction, and to send the relay instruction to the Wi-Fi module in a group mode of the P2P node of Wi-Fi to broadcast the service set identifier at the first length over the second channel.

The at least one instruction may be further configured to be executed by the at least one processor 501 for the mobile device to send a routing table to the Wi-Fi module, where the routing table includes a route between a first IP address of the P2P node, and a second IP address of the station node, and to send configuration information of a Network Address Translation (NAT) function to the Wi-Fi module so that the first IP address of the P2P node is translated.

The at least one instruction may be further configured to be executed by the at least one processor 501 for the mobile device to send the address of a gateway of the Domain Name System (DNS) based on the Transport Control Protocol (TCP) to the Wi-Fi module; and to send the address of the gateway of the Domain Name System (DNS) based on the open system internet protocol UDP to the Wi-Fi module.

The at least one instruction may be further configured to be executed by the at least one processor 501 for the mobile device, if the one or more electronic devices are verified successfully against the broadcasted login information, to have the one or more electronic devices access the P2P node.

The at least one instruction may be further configured to be executed by the at least one processor 501 for the mobile device to return a response message to the one or more electronic devices upon reception of a request sent by the one or more electronic devices for a service set identifier in the login information, to verify a password in the connection request for consistency with a password in the login information according to a second length of the password in the login information, upon reception of a connection request sent by the one or more electronic devices, and if the passwords are consistent, to have the one or more electronic device access.

The at least one instruction may be further configured to be executed by the at least one processor 501 for the mobile device to receive in the P2P node a data packet sent by the electronic device, to forward the data packet from the P2P node to the station node, and to send the data packet in the station node to the wireless access point for forwarding to a target device.

The at least one instruction may be further configured to be executed by the at least one processor 501 for the mobile device to determine whether a source address of the data packet is a first IP address of the P2P node; and if so, to translate the first IP address into a target IP address, to search a routing table for a second IP address corresponding to the first IP address, and to forward a converted data packet from the target IP address to the station node at the second IP address.

The at least one instruction may be further configured to be executed by the at least one processor 501 for the mobile device to receive in the station node a data packet sent by the wireless access point, to forward the data packet from the station node to the P2P node, and to send the data packet in the P2P node to the electronic device.

The at least one instruction may be further configured to be executed by the at least one processor 501 for the mobile device to determine a second IP address of a station node from which the data packet is to be forwarded, to search a routing table for a first IP address corresponding to the second IP address, and to forward the data packet to the P2P node at the first IP address.

Since the embodiments of the apparatus are substantially similar to the embodiments of the method, the embodiments of the apparatus have been described in brief, and reference may be made to the description of the embodiments of the method for details of the embodiments of the apparatus.

Figure 6:
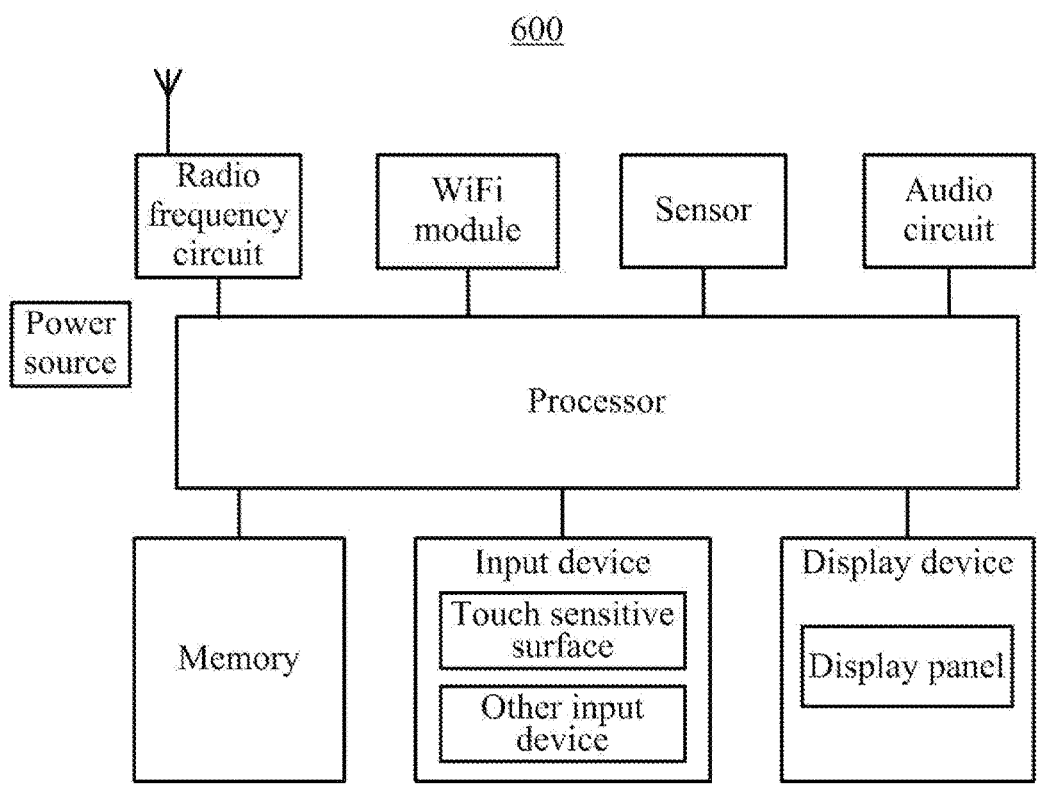
FIG. 6 is a structural block diagram of a relaying apparatus according to some embodiments of this disclosure.

Referring to FIG. 6, a particular structural block diagram of a relaying apparatus according to some embodiments of this disclosure is illustrated. The apparatus may be any one of mobile devices (e.g., a handset, a tablet computer, a PDA, a smart wearable device, etc.), and may include a processor including one or more processing cores, a radio frequency circuit, a memory including one or more computer readable storage mediums, an input device, a display device, a sensor, an audio circuit, a Wi-Fi module, a power source, and other components. Those skilled in the art may appreciate that the mobile device in this embodiment will not be limited to the structure as illustrated, but may include more or less components or some of the components may be combined or different components may be arranged, where:

The radio frequency circuit may be configured to receive and transmit a signal in receiving and transmitting information or in communication, and particularly to receive and then pass downlink information of a base station to the one or more processors for processing; and to send uplink data to the base station. Typically the radio frequency circuit includes but will not be limited to an antenna, at least one amplifier, a tuner, one or more oscillators, a Subscriber Identifier Module (SIM) card, a transducer, a coupler, a Low Noise Amplifier (LNA), a duplexer, etc. Moreover the radio frequency circuit may further communicate wirelessly with a network and another device in any one of communication standards or protocols including but not limited to a Global System of Mobile communication (GSM), a General Packet Radio Service (GPRS), a Code Division Multiple Access (CDMA), a Wideband Code Division Multiple Access (WCDMA), a Long Term Evolution (LTE), an e-mail, a Short Messaging Service (SMS), etc.

The memory may be configured to store software programs and modules, and the processor is configured to run the software programs and modules stored in the memory to thereby perform various function applications and data processing. The memory may generally include a program storage area and a data storage area, where an operating system, applications required for at least one function (e.g., an audio playing function, an image playing function, etc.), etc., may be stored in the program storage area; and data created for use of the mobile device (e.g., audio data, an address book, etc.), etc., may be stored in the data storage area. Moreover the memory may include a high-speed random access memory, and may further include a nonvolatile memory, e.g., at least one magnetic disks memory device, a flash memory device or another volatile solid memory device. Correspondingly the memory may further include a memory controller configured to provide an access of the processor and the input device to the memory.

The input device may be configured to receive input digital or character information and to generate a keyboard, mouse, joystick, optical or track ball signal input related to user setting and function control. Particularly the input device may include a touch sensitive surface and other input devices. The touch surface, also referred to as a touch display screen or a touch control panel, may collect a touch operation by a user thereon or in proximity thereto (e.g., an operation by the user using a finger, a touch pen or any other appropriate object or attachment on or in proximity to the touch sensitive surface) and drive a corresponding connected device by a preset program. Optionally the touch sensitive surface may include two components of a touch detection device and a touch controller, where the touch detection device detects the position of touching by the user, and detects a signal as a result of the touch operation and transfers the signal to the touch controller; and the touch controller receives the touch signal from the touch detection device, and converts it into coordinates of a touch point and further transfers them to the processor, and may receive and execute a command sent by the processor. Moreover the touch sensitive surface may be embodied in various types of resistive, capacitive, infrared, surface sound wave and other types. The input device may further include another input device in addition to the touch sensitive surface. Particularly the other input devices may include but will not be limited to one or more of a physical keyboard, functional keys (e.g., volume control buttons, a power button, etc.), a track ball, a mouse, a joystick, etc.

The display device may be configured to display information entered by the user or information provided to the user and various graphic user interfaces of the mobile device 600, where these graphic user interfaces may be composed of graphics, texts, icons, videos or any combination thereof. The display unit may include a display panel, and optionally the display panel may be configured in the form of a Liquid Crystal Display (LCD), an Organic Light-Emitting Diode (OLED) display, etc. Furthermore the touch sensitive surface may overlie the display panel, and the touch sensitive surface detecting the touch operation thereon or in proximity thereto transfers it to the processor to determine the type of the touch event, and thereafter the processor provides a corresponding visual output on the display panel according to the type of the touch event. Although the touch sensitive surface and the display panel are embodied in this embodiment as two separate components to perform the input and output functions, the touch sensitive surface and the display panel may be integrated to perform the input and output functions in some embodiments.

The mobile device 600 may further include at least one sensor, e.g., an optical sensor, a motion sensor and other sensors. The optical sensor may include an ambient optical sensor and a proximity sensor, where the ambient optical sensor may adjust the brightness of the display panel according to the illumination of ambient light rays, and the proximity sensor may disable the display panel and/or a backlight when the mobile device 600 moves in proximity to an ear. A gravity acceleration sensor which is a motion sensor may detect the magnitudes of accelerations in respective directions (typically three axes), and may detect the magnitude and the direction of gravity when the sensor is stationary and may be configured to perform applications of identifying the posture of a handset (e.g., switching between landscape and portrait modes, relevant games, calibration of the posture of a magnetometer, etc.), a relevant function of identifying vibration (e.g., a pedometer, a knock, etc.), etc.; and the mobile device 600 may be further configured with a gyroscope, a barometer, a hygrometer, a thermometer, an infrared sensor and other sensors, although a repeated description of these components will be omitted here.

The audio circuit, a speaker and a transducer may provide an audio interface between the user and the mobile device 600. The audio circuit may receive and convert audio data into an electric signal and transmit the electric signal to the speaker, which is converted by the speaker into an audio signal for output; and on the other hand, the transducer converts a collected audio signal into an electric signal which is received by the audio circuit and then converted into audio data, and the audio data is further output to the processor for processing and then transmitted by the radio frequency circuit to another device, for example, or the audio data is output to the memory for further processing. The audio circuit may further include an earphone jack for communication between an external earphone and the mobile device 600.

The WiFi is a technology of short-range wireless transmission, and the mobile device 600 may assist the user in transmitting and receiving an email, browsing a webpage, accessing streaming media, etc., through the WiFi module, and provide the user with a wireless broadband access to the Internet.

The processor is a control center of the mobile device 600, has the respective components connected by various interfaces and lines, and runs or executes the software programs and/or modules stored in the memory and invokes the data stored in the memory to perform the various functions of the mobile device 600 and process the data to thereby manage and control the mobile device as a whole. Optionally the processor may include one or more processing cores; and preferably the processor may be integrated with an application processor and a modem processor, where the application processor generally handles the operating system, the user interfaces, the applications, etc., and the modem processor generally handles wireless communication. As may be appreciated, the modem processor may not be integrated into the processor.

The mobile device 600 further includes a power source (e.g., a battery) powering the respective components, and preferably the power source may be logically connected with the processor through a power management system to thereby perform charging and discharging management, power consumption management, and other functions through the power management system. The power source may further include one or more DC or AC power sources, recharging systems, power source failure detection circuits, power source transformers or inverters, power source status indicators, and other any appropriate components.

Although not illustrated, the mobile device 600 may further include a camera, a Bluetooth module, etc., although a repeated description thereof will be omitted here. Particularly in this embodiment, the memory and the processor may be further configured as described above in the embodiment illustrated in FIG. 5, and reference may be made to FIG. 5 and the related description thereof for the memory and the processor.

The respective embodiments in the description have been described progressively, and each of the embodiments has been focused on its differences from the other embodiments, and the description of their commonalities may be applied to each other.

Those skilled in the art shall appreciate that the embodiments of the disclosure may be embodied as a method, a system or a computer program product. Therefore the disclosure may be embodied in the form of an all-hardware embodiment, an all-software embodiment or some embodiments of software and hardware in combination. Furthermore the disclosure may be embodied in the form of a computer program product embodied in one or more computer useable storage mediums (including but not limited to a disk memory, a CD-ROM, an optical memory, etc.) in which computer useable program codes are contained.

The disclosure has been described in a flow chart and/or a block diagram of the method, the device (system) and the computer program product according to the embodiments of the disclosure. It shall be appreciated that respective flows and/or blocks in the flow chart and/or the block diagram and combinations of the flows and/or the blocks in the flow chart and/or the block diagram may be embodied in computer program instructions. These computer program instructions may be loaded onto a general-purpose computer, a specific-purpose computer, an embedded processor or a processor of another programmable data processing device to produce a machine so that the instructions executed on the computer or the processor of the other programmable data processing device create means for performing the functions specified in the flow(s) of the flow chart and/or the block(s) of the block diagram.

These computer program instructions may also be stored into a computer readable memory capable of directing the computer or the other programmable data processing device to operate in a specific manner so that the instructions stored in the computer readable memory create an article of manufacture including instruction means which perform the functions specified in the flow(s) of the flow chart and/or the block(s) of the block diagram.

These computer program instructions may also be loaded onto the computer or the other programmable data processing device so that a series of operational steps are performed on the computer or the other programmable data processing device to create a computer implemented process so that the instructions executed on the computer or the other programmable device provide steps for performing the functions specified in the flow(s) of the flow chart and/or the block(s) of the block diagram.

Although the preferred embodiments of the disclosure have been described, those skilled in the art benefiting from the underlying inventive concept may make additional modifications and variations to these embodiments. Therefore the appended claims are intended to be construed as encompassing the preferred embodiments and all the modifications and variations coming into the scope of the disclosure.

Lastly it shall be further noted that such relationship terms in this context as first and second, etc., are merely intended to distinguish one entity or operation from another entity or operation but not necessarily intended to require or suggest any such a real relationship or order between these entities or operations. Furthermore the terms "include", "comprise" and any variants thereof are intended to encompass nonexclusive inclusion so that a process, a method, an article or a device including a series of elements includes both those elements and one or more other elements which are not listed explicitly or one or more elements inherent to the process, the method, the article or the device. Unless stated otherwise, an element being defined in the sentence "include/comprise a(n) . . . ." will not exclude the presence of one or more additional identical element in the process, the method, the article or the device including the element.

The relaying method of a mobile device, and the mobile device, according to the embodiments of the disclosure have been described above in details, and the principle of the disclosure and the embodiments thereof have been set forth in this context by way of several examples, but the embodiments above have been described only for the purpose of facilitating understanding of the method of the disclosure and the core idea thereof; and moreover those ordinarily skilled in the art may modify the embodiments and application scopes of the disclosure without departing from the spirit of the disclosure, and in summary the disclosure of the disclosure will not be construed as limiting the disclosure.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The invention claimed is:

1. A mobile device comprising at least one processor, a Wi-Fi module, and a memory in which instructions executable by the at least one processor are stored, wherein the at least one processor is configured to execute the instructions to:
connect with a wireless access point through a station node of the Wi-Fi module;
broadcast login information to one or more external electronic devices;
connect with the one or more external electronic devices through a Peer-to-Peer (P2P) node of the Wi-Fi module after the one or more external electronic devices have been verified based on the broadcasted login information;
enable a packet forwarding function in the mobile device to support a data packet to be forwarded between the station node and the P2P node in the mobile device;
send configuration information for the packet forwarding function to the Wi-Fi module to allow the data packet to be forwarded between the station node and the P2P node;
receive the login information from the one or more external electronic devices for logging into the mobile device, the login information comprising a service set identifier and a password;
calculate a length of the service set identifier, and a length of the password;
encapsulate the service set identifier, the length of the service set identifier, the password and the length of the password in a relay instruction: and
send the relay instruction to the Wi-Fi module in a group mode of the P2P node to broadcast the service set identifier over a predefined channel.

2. The mobile device according to claim 1, wherein the at least one processor is further configured to execute the instructions to send configuration information of a Domain Name System (DNS) to the Wi-Fi module so that a data packet received by the P2P node is forwarded.

3. The mobile device according to claim 1, wherein the at least one processor is further configured to execute the instructions to:
receive in the P2P node a data packet sent by the one or more external electronic devices;
forward the data packet from the P2P node to the station node; and
send the data packet from the station node to the wireless access point for forwarding the data packet to a target device.

4. The mobile device according to claim 1, wherein the at least one processor is further configured to execute the instructions to:
receive in the station node a data packet sent from the wireless access point;
forward the data packet from the station node to the P2P node; and
send the data packet from the P2P node to the one or more external electronic devices.

5. The mobile device according to claim 1, wherein the at least one processor is further configured to execute the instructions to:
send a routing table to the Wi-Fi module, wherein the routing table comprises a route between an IP address for the P2P node and an IP address for the station node; and
send configuration information of a Network Address Translation (NAT) function to the Wi-Fi module so that the IP address for the P2P node is translated.

6. A relaying method of a mobile device, the method comprising:
connecting with a wireless access point through a station node of a Wi-Fi module in the mobile device;
broadcasting login information to one or more external electronic devices;
connecting with the one or more external electronic devices through a Peer-to-Peer (P2P) node of the Wi-Fi module in the mobile device after the one or more external electronic devices have been verified based on the broadcasted login information;
enabling a packet forwarding function in the mobile device to support a data packet to be forwarded between the station node and the P2P node in the mobile device;
sending configuration information for the packet forwarding function to a Wi-Fi module in the mobile device to allow the data packet to be forwarded between the station node and the P2P node;
wherein broadcasting the login information to the one or more external electronic devices comprises receiving the login information from the one or more external electronic devices for logging into the mobile device, the login information comprising a service set identifier and a password, calculating a length of the service set identifier, and a length of the password, encapsulating the service set identifier, the length of the service set identifier, the password and the length of the password in a relay instruction, and sending the relay instruction to the Wi-Fi module in a group mode of the P2P node to broadcast the service set identifier over a predefined channel.

7. The method according to claim 6, further comprising:
sending configuration information of a DNS to the Wi-Fi module so that a data packet received by the P2P node is forwarded.

8. The method according to claim 6, wherein sending the configuration information for the packet forwarding function to the Wi-Fi module comprises:
sending a routing table to the Wi-Fi module, wherein the routing table comprises a route between an IP address for the P2P node, and an IP address for the station node; and
sending configuration information of a Network Address Translation (NAT) function to the Wi-Fl module so that the IP address for the P2P node is translated.

9. The method according to claim 7, wherein sending the DNS to the Wi-Fi module comprises:
sending an address of a gateway of the DNS based on a Transport Control Protocol (TCP) to the Wi-Fi module; and
sending the address of the gateway of the DNS based on an open system internet protocol to the Wi-Fi module.

10. The method according to claim 6, wherein connecting with the one or more external electronic devices through the P2P node comprises:
- upon receiving a request from the one or more external electronic devices for a service set identifier in the login information, returning a response message to the one or more external electronic devices;
- upon receiving a connection request from the one or more external electronic devices, verifying a password in the connection request for consistency with a password in the login information according to a length of the password in the login information; and
- in response to the password in the connection request being consistent with the password in the login information, having the one or more external electronic devices connect with the P2P node.

11. The method according to claim 6, further comprising:
- receiving in the P2P node a data packet sent by the one or more external electronic devices;
- forwarding the data packet from the P2P node to the station node; and
- sending the data packet from the station node to the wireless access point for forwarding the data packet to a target device.

12. The method according to claim 11, wherein the data packet comprises Uniform Resource Locator (URL) information, and the wireless access point is configured to map the URL information to an IP address through a DNS and forward the data packet to the target device at the IP address.

13. The method according to claim 11, wherein forwarding the data packet from the P2P node to the station node comprises:
- determining whether a source address of the data packet is a first IP address of the P2P node;
- in response to determining that the source address of the data packet is the first IP address for the P2P node, translating the first IP address into a target IP address;
- searching a routing table for a second IP address corresponding to the first IP address; and
- forwarding a converted data packet from the target IP address to the station node at the second IP address.

14. The method according to claim 6, further comprising:
- receiving in the station node a data packet sent from the wireless access point;
- forwarding the data packet from the station node to the P2P node; and
- sending the data packet from the P2P node to the one or more external electronic devices.

15. The method according to claim 14. wherein forwarding the data packet from the station node to the P2P node comprises:
- determining a second IP address of the station node from which the data packet is to be forwarded;
- searching a routing table for a first IP address corresponding to the second IP address; and
- forwarding-the data packet to the P2P node at the first IP address.

16. The method according to claim 6, wherein the predefined channel does not interfere with a channel connecting the wireless access point and the station node in the mobile device.

17. The mobile device according to claim 1, wherein the predefined channel does not interfere with a channel connecting the wireless access point and the station node in the mobile device.

\* \* \* \* \*